(12) United States Patent
Kageyama et al.

(10) Patent No.: US 8,569,634 B2
(45) Date of Patent: Oct. 29, 2013

(54) COMBINATION MEASURING DEVICE WITH HOPPERS HAVING AN ARCUATE ARRANGEMENT

(75) Inventors: Toshiharu Kageyama, Shiga (JP); Mikio Kishikawa, Shiga (JP)

(73) Assignee: Ishida Co., Ltd., Kyoto (JP)

( * ) Notice: Subject to any disclaimer, the term of this patent is extended or adjusted under 35 U.S.C. 154(b) by 506 days.

(21) Appl. No.: 12/988,383

(22) PCT Filed: Apr. 8, 2009

(86) PCT No.: PCT/JP2009/057224
§ 371 (c)(1),
(2), (4) Date: Oct. 18, 2010

(87) PCT Pub. No.: WO2009/128379
PCT Pub. Date: Oct. 22, 2009

(65) Prior Publication Data
US 2011/0036645 A1   Feb. 17, 2011

(30) Foreign Application Priority Data

Apr. 17, 2008 (JP) ................................. 2008-107499
Apr. 18, 2008 (JP) ................................. 2008-108419

(51) Int. Cl.
*G01G 19/387* (2006.01)
(52) U.S. Cl.
USPC .................................................... 177/25.18
(58) Field of Classification Search
USPC ..................................................... 177/25.18
See application file for complete search history.

(56) References Cited

U.S. PATENT DOCUMENTS

| | | | |
|---|---|---|---|
| 4,663,917 A | 5/1987 | Taylor et al. | |
| 4,840,240 A | 6/1989 | Toyoda et al. | |
| 4,844,190 A * | 7/1989 | Mikami et al. | 177/25.18 |
| 4,844,191 A * | 7/1989 | Mikami et al. | 177/25.18 |
| 6,756,546 B2 * | 6/2004 | Komatsu | 177/25.18 |
| 6,903,279 B2 | 6/2005 | Taylor | |
| 8,093,514 B2 * | 1/2012 | Higuchi et al. | 177/25.18 |
| 2009/0133939 A1* | 5/2009 | Taylor et al. | 177/108 |
| 2010/0224421 A1* | 9/2010 | Kawanishi | 177/25.18 |
| 2010/0243339 A1* | 9/2010 | Kawanishi | 177/145 |
| 2011/0036645 A1* | 2/2011 | Kageyama et al. | 177/25.18 |

FOREIGN PATENT DOCUMENTS

| | | |
|---|---|---|
| EP | 1340677 A2 | 9/2003 |
| JP | S56-86522 A | 7/1981 |
| JP | 60-178319 A | 9/1985 |
| JP | 01-129629 U | 9/1989 |

(Continued)

OTHER PUBLICATIONS

Japanese Office Action of the corresponding Japanese Application No. 2008-108419, dated May 31, 2012.

(Continued)

*Primary Examiner* — Randy W Gibson
(74) *Attorney, Agent, or Firm* — Global IP Counselors, LLP

(57) ABSTRACT

A combination measuring device has a combination measuring unit. The combination measuring unit has a dispersing section configured to radially disperse articles loaded thereinto from above, a plurality of head sections configured to receive the articles from the dispersing section, and an assembling section configured to assemble the articles, which are contained in hoppers of one or more of the head sections selected according to a target weight. The head sections are arranged on a line formed by cutting away a circular arc from a circle surrounding the dispersing section.

10 Claims, 10 Drawing Sheets

(56) References Cited

FOREIGN PATENT DOCUMENTS

| | | |
|---|---|---|
| JP | 02-021219 A | 1/1990 |
| JP | 04-041304 Y2 | 9/1992 |
| JP | 07-015399 B2 | 2/1995 |
| JP | 08-054278 A | 2/1996 |
| JP | 2852832 B2 | 11/1998 |
| JP | 2003-149036 A | 5/2003 |
| JP | 2007-315839 A | 12/2007 |
| JP | 2009-069101 A | 4/2009 |

OTHER PUBLICATIONS

Packaging Buyers Guide, Jan. 1987, vol. 32 No. 2, Cahners Publishing Company, A Division of Reed Publishing USA.
Good Packaging Magazine, Jul. 1987, vol. 48 No. 7, Erich Printing and Lithographic, California, pp. 62-63.
Good Packaging Magazine, Oct. 1987, pp. 12-13.
Packaging, Jul. 1987, vol. 32 No. 9, p. 129.

* cited by examiner

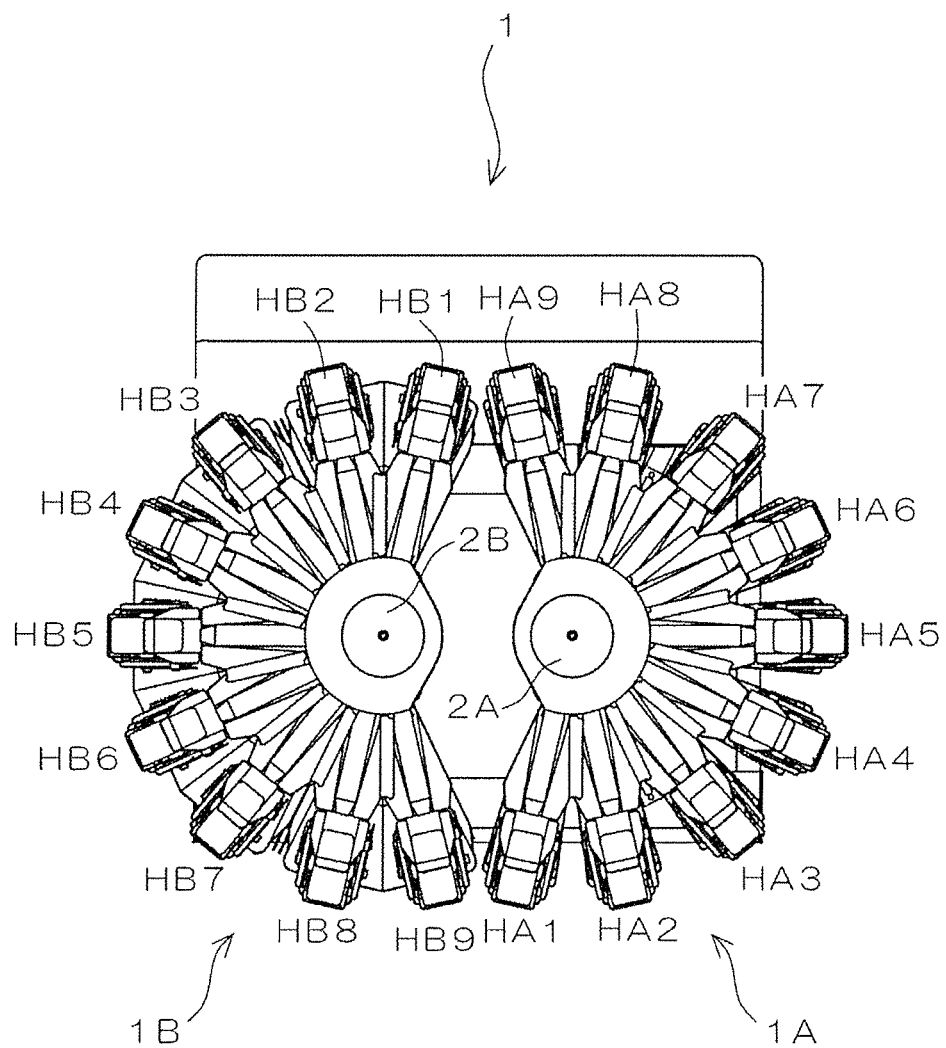
F I G. 2

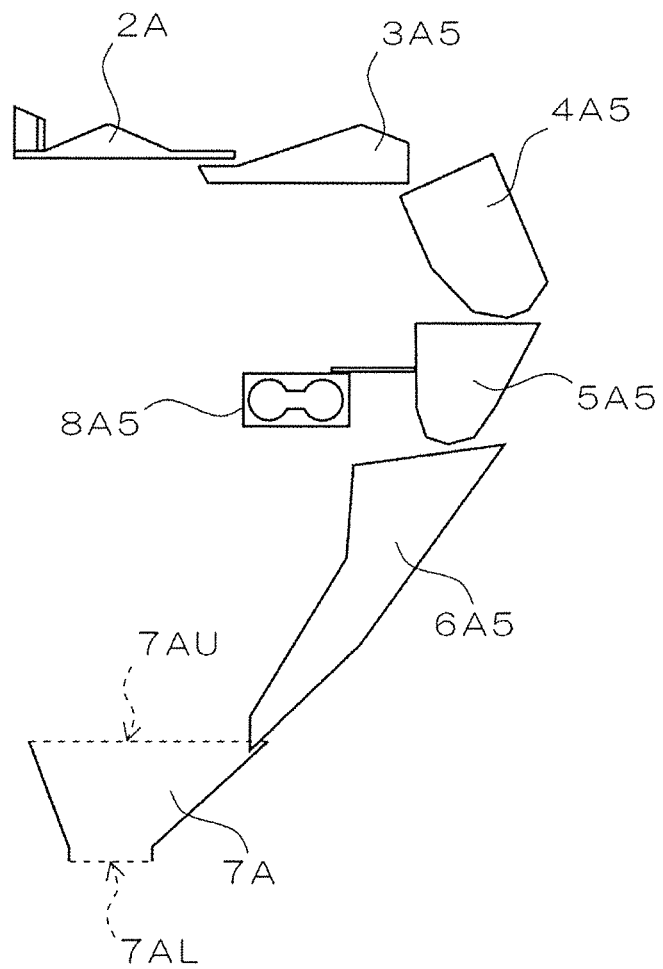
F I G. 6

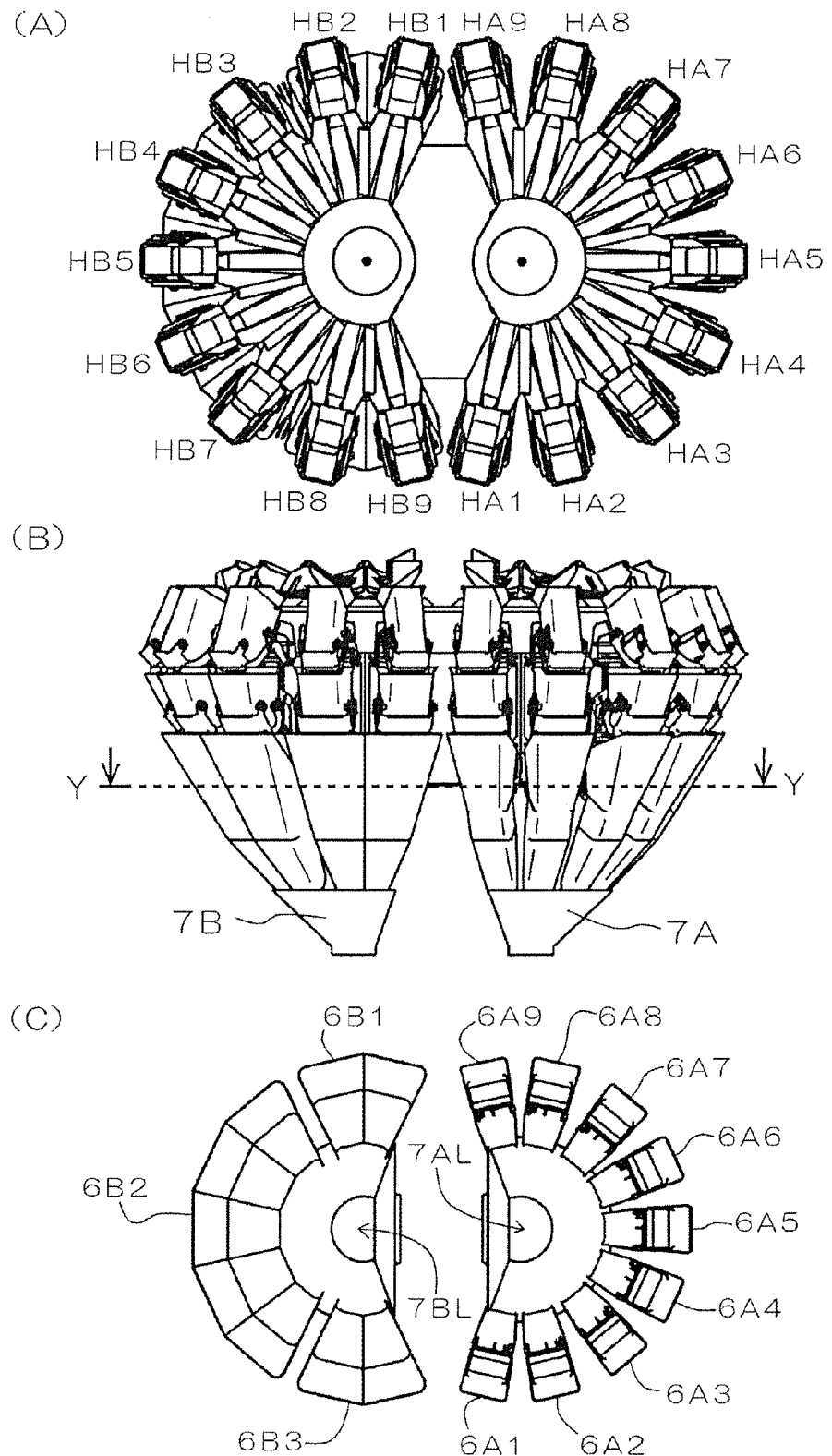
F I G. 7

COMBINATION MEASURING DEVICE WITH HOPPERS HAVING AN ARCUATE ARRANGEMENT

CROSS-REFERENCE TO RELATED APPLICATIONS

This national phase application claims priority to Japanese Patent Application No. 2008-107499 filed on Apr. 17, 2008 and Japanese Patent Application No. 2008-108419 filed on Apr. 18, 2008. The entire disclosures of Japanese Patent Application Nos. 2008-107499 and 2008-108419 are hereby incorporated herein by reference.

TECHNICAL FIELD

The present invention relates to a combination measuring device.

BACKGROUND ART

An example of a combination measuring device relating to background art is disclosed in Japanese Examined Utility Model Application Publication No. 4-41304. The combination measuring device comprises a dispersing table; fourteen feed troughs arranged at regular intervals on a circle surrounding the dispersing table; fourteen pool hoppers, which being respectively provided below distal end portions of the feed troughs; and fourteen measuring hoppers, which being respectively provided below the pool hoppers. In other words, the combination measuring device is one that comprises fourteen heads.

SUMMARY OF THE INVENTION

A method for modifying the combination measuring device comprising fourteen heads, disclosed in Japanese Examined Utility Model Application Publication no. 4-41304, into one comprising, for example, nine heads, is examined. In such an instance, the simplest modification would be to provide nine feed troughs at regular intervals along the whole of the circle surrounding the dispersing table.

However, simply reducing the number of feed troughs from fourteen to nine would result in a gap between adjacent feed troughs. Therefore, in order to fill the gap between each of the adjacent feed troughs, it is necessary to increase the width of each of the feed troughs ("trough width" hereafter). However, in an instance where the trough width exceeds an optimum width, articles disperse excessively within the feed trough, causing a decrease in the efficiency of conveyance of the articles by the feed trough. As a result, the stability of the supply of the articles from the feed trough to the pool hopper is compromised.

It is also possible to reduce the diameter of the dispersing table, instead of increasing the trough width, to fill the gap between adjacent feed troughs. However, in such an instance, the upper area of the dispersing table decreases with the reduction in the diameter, and the function of the dispersing table of accumulating the articles therefore decreases. As a result, the stability of the supply of the articles from the dispersing table to the feed trough, and the stability of the supply of the articles from the feed trough to the pool hopper, are compromised.

With the above-mentioned circumstances in view, an object of the present invention is to obtain a combination measuring device that neither requires an increase in the trough width nor a reduction in the diameter of the dispersing table, thereby making it possible to prevent the stability of the supply of the articles to each of the hoppers in a plurality of heads from being compromised.

A combination measuring device according to a first aspect of the present invention includes a combination measuring unit. The combination measuring unit has a dispersing section configured and arranged to radially disperse articles loaded thereinto from above, a plurality of head sections configured and arranged to receive the articles from the dispersing section with each of the head sections having a hopper to hold the articles therein, and an assembling section configured and arranged to assemble the articles, which are contained in one or more of the hoppers selected according to a target weight. The head sections are arranged on a line formed by cutting away a circular arc from a circle surrounding the dispersing section.

According to the combination measuring unit in the combination measuring device of the first aspect, the heads are arranged on the line formed by cutting away a circular arc from the circle, which has the circular arc as a part thereof, surrounding the dispersing section. Therefore, in comparison to a combination measuring unit in which the same number of heads are arranged along the whole of the circle surrounding the dispersing section, the heads can be provided in close proximity to each other. Therefore, there is no need to increase the trough width in order to fill the gap between adjacent troughs, making it possible to use troughs having an optimum trough width. As a result, it is possible to prevent the efficiency of conveyance of the articles by the trough from decreasing. Also, there is no need to reduce the diameter of the dispersing section in order to fill the gap between adjacent troughs, making it possible to prevent the function of the dispersing section of accumulating the articles from decreasing. As a result, according to the combination measuring device according to the first aspect, it is possible to achieve stable supply of the articles into the hoppers.

The combination measuring device according to a second aspect of the present invention is the combination measuring device according to the first aspect of the present invention, wherein the at least one combination measuring unit includes a plurality of the combination measuring units. The combination measuring units are connected so that regions corresponding to the circular arcs face each other.

According to the combination measuring device of the second aspect, a plurality of the combination measuring units are connected so that respective portions corresponding to the circular arcs, which do not face the heads, face each other. Therefore, it becomes possible to reduce the overall area on which the device is installed in comparison with an instance in which a plurality of combination measuring units are arranged individually in a row without being connected. In other words, it becomes possible to effectively utilize dead spaces on which the heads are not provided, while reducing the area on which the device is installed.

The combination measuring device according to a third aspect of the present invention is the combination measuring device according to the second aspect, wherein in each of the combination measuring units, the assembly section has an ejecting outlet via which the article are ejected to the exterior of the combination measuring unit, and the ejecting outlet is positioned at substantially a center of the circle.

According to the combination measuring device of the third aspect, in each of the combined measuring units, the ejecting outlet for ejecting the articles is positioned at substantially a center of the circle along which the plurality of hoppers are arranged. Therefore, in each of the combined measuring units, the distances between each of the hoppers and the ejecting outlet are substantially equal. Therefore, it becomes possible to substantially equalize, in the hoppers, the time required for an article ejected by the hopper to reach the ejecting outlet, and the falling velocity of the article upon reaching the ejecting outlet. Consequently, the processing speed of the combined measuring device can be prevented from being diminished as a result of any variation in the required time or the fall velocity.

A combination measuring device according to a fourth aspect of the present invention is the combination measuring device according to the second or third aspects, wherein in each of the combination measuring units, a part of an outer peripheral region of the dispersing section is designated as a non-ejecting region in which articles are not ejected, and the non-ejecting region includes a route for carrying the articles from a vicinity of one of the head sections that is adjacent to one end of the non-ejecting region to a vicinity of one of the head sections that is adjacent to the other end of the non-ejecting region.

According to the combination measuring device of the fourth aspect, a route for carrying the articles from the vicinity of a head adjacent to one end of the non-ejecting region to the vicinity of a head adjacent to the other end of the non-ejecting region is provided to the non-ejecting region of the dispersing section. Therefore, it becomes possible to effectively utilize the non-ejecting region, which represents a dead space, while effectively preventing excessive supply of articles to the head adjacent to one end as well as a shortfall in supply of articles to the head adjacent to the other end.

A combination measuring device according to a fifth aspect of the present invention is the combination measuring device according to any of the first through fourth aspects, wherein a part of an outer peripheral region of the dispersing section is designated as a non-ejecting region in which the articles are not ejected. The dispersing section includes a first path, along a radial direction of the dispersing section, for channeling the articles from a center section of the dispersing section toward a vicinity of one of the head sections, and a second path, along a circumferential direction of the dispersing section, for channeling the articles from the non-ejecting region towards the vicinity of the one of the head sections. The one of the head sections is adjacent to the non-ejecting region.

According to the combination measuring device of the fifth aspect, a region forming part of the dispersing section is designated as a non-ejecting region in which the articles are not ejected from the dispersing section. In addition to a first path for carrying the articles towards the vicinity of the first head that is adjacent to the non-ejecting region, where there is likely to be a shortfall in the amount of articles supplied from the dispersing section, there is also provided a second path. Therefore, more articles can be supplied to the first head compared to a device in which only the first path is provided. As a result, it becomes possible to prevent the amount of articles supplied from the dispersing section from deviating significantly from an appropriate level in the first head.

A combination measuring device according to a sixth aspect of the present invention is a combination measuring device according to any of the first through fourth aspects, wherein a part of an outer peripheral region of the dispersing section is designated as a non-ejecting region in which the articles are not ejected. The dispersing section includes a path for channeling, towards the non-ejecting region, the articles that were carried on the dispersing section towards a vicinity of one of the head sections adjacent to the non-ejecting region but that was not supplied to the second head.

According to the combination measuring device of the sixth aspect, a region forming part of the dispersing section is designated as a non-ejecting region in which articles are not ejected from the dispersing section. There is provided a path for ejecting, towards the non-ejecting region, articles that were carried on the dispersing section towards the vicinity of the second head that is adjacent to the non-ejecting region, where there is likely to be an excess in the amount of articles supplied from the dispersing section, but not supplied to the second head. Therefore, the device makes it possible to reduce the degree by which the amount of articles supplied from the dispersing section to the second head becomes excessive, compared to a device that does not have such a path. As a result, it becomes possible to prevent the amount of articles supplied from the dispersing section from deviating significantly from an appropriate level in the second head.

A combination measuring device according to a seventh aspect of the present invention is a combination measuring device according to any of the fourth through sixth aspects, wherein the non-ejecting region faces a region corresponding to the circular arc.

According to the present invention, there is no need to increase the trough width or reduce the diameter of the dispersing section, and it therefore becomes possible to prevent the stability of supply of articles to each of the hoppers in a plurality of heads from being compromised.

BRIEF DESCRIPTION OF THE DRAWINGS

FIG. 2 is a top view showing the combination measuring device viewed from the direction of arrow X1 shown in FIG. 1.

FIG. 6 is a schematic side view showing a configuration of a head section.

FIG. 7 is a drawing illustrating a positional relationship between an article-ejecting outlet and a head section.

DESCRIPTION OF EMBODIMENTS

An embodiment of the present invention will now be described in detail with reference to the drawings. Elements affixed with identical labels on different drawings represent elements that are identical or equivalent.

Figure 1:
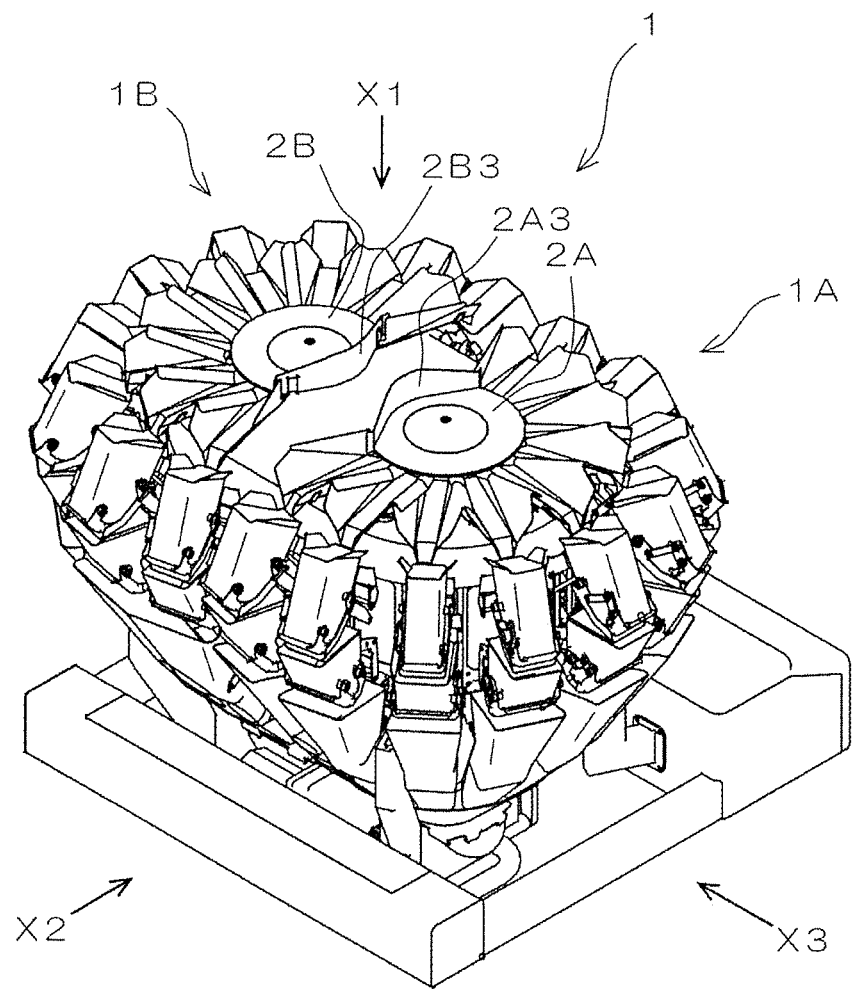
FIG. 1 is a perspective view showing an overall configuration of a combination measuring device according to an embodiment of the present invention.
Figure 3:
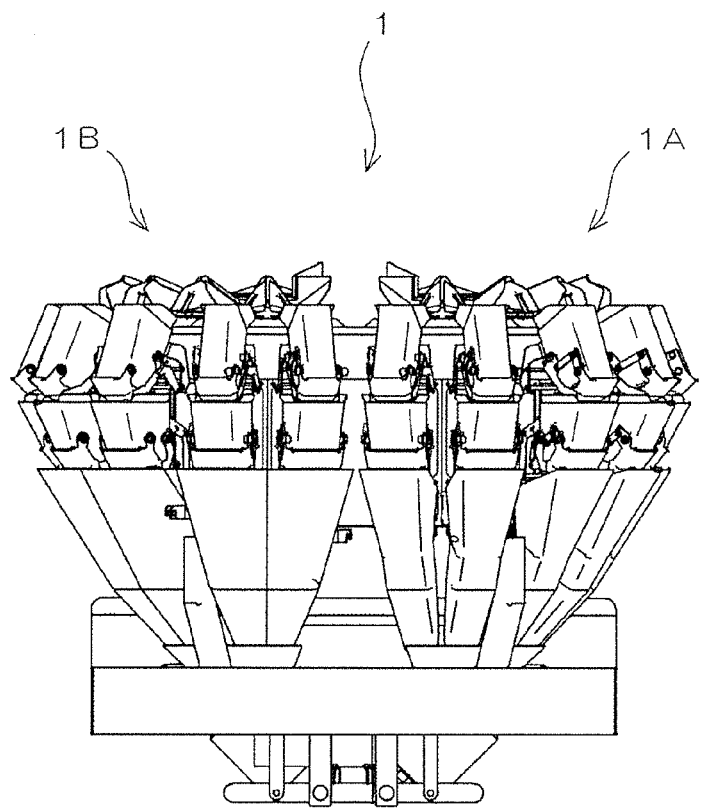
FIG. 3 is a front view showing the combination measuring device viewed from the direction of arrow X2 shown in FIG. 1.
Figure 4:
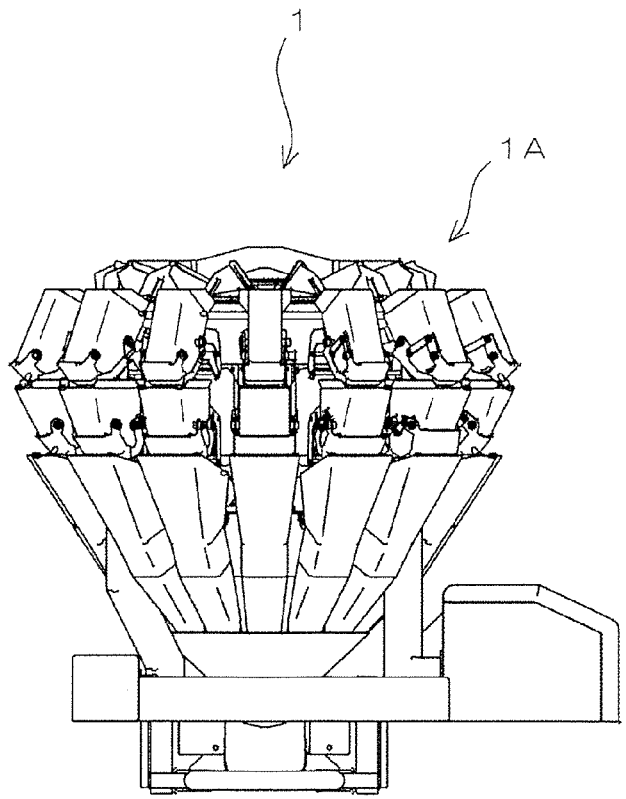
FIG. 4 is a side view showing the combination measuring device viewed from the direction of arrow X3 shown in FIG. 1.

FIG. 1 is a perspective view showing an overall configuration of a combination measuring device 1 according to an embodiment of the present invention. FIG. 2 is a top view showing the combination measuring device 1 viewed from the direction of arrow X1 shown in FIG. 1; FIG. 3 is a front view showing the combination measuring device 1 viewed from the direction of arrow X2 shown in FIG. 1; and FIG. 4 is a side view showing the combination measuring device 1 viewed from the direction of arrow X3 shown in FIG. 1.

As shown in FIGS. 1 through 4, the combination measuring device 1 comprises a combination measuring unit 1A and a combination measuring unit 1B. As shown in FIGS. 1 and 2, the combination measuring unit 1A has a dispersing table 2A, and the combination measuring unit 1B has a dispersing table 2B. The dispersing table 2A is provided at a center (including substantially the center) of a main unit body of the combination measuring unit 1A, and the dispersing table 2B is provided at a center (including substantially the center) of a main unit body of the combination measuring unit 1B. As shown in FIG. 2, the combination measuring unit 1A has a plurality (nine in the present example) of head sections or heads HA1 through HA9. Similarly, the combination measuring unit 1B has a plurality (nine in the present example) of head sections or heads HB1 through HB9. In other words, each of the combination measuring units 1A, 1B is a combination measuring unit comprising 9 head sections.

Figure 5:
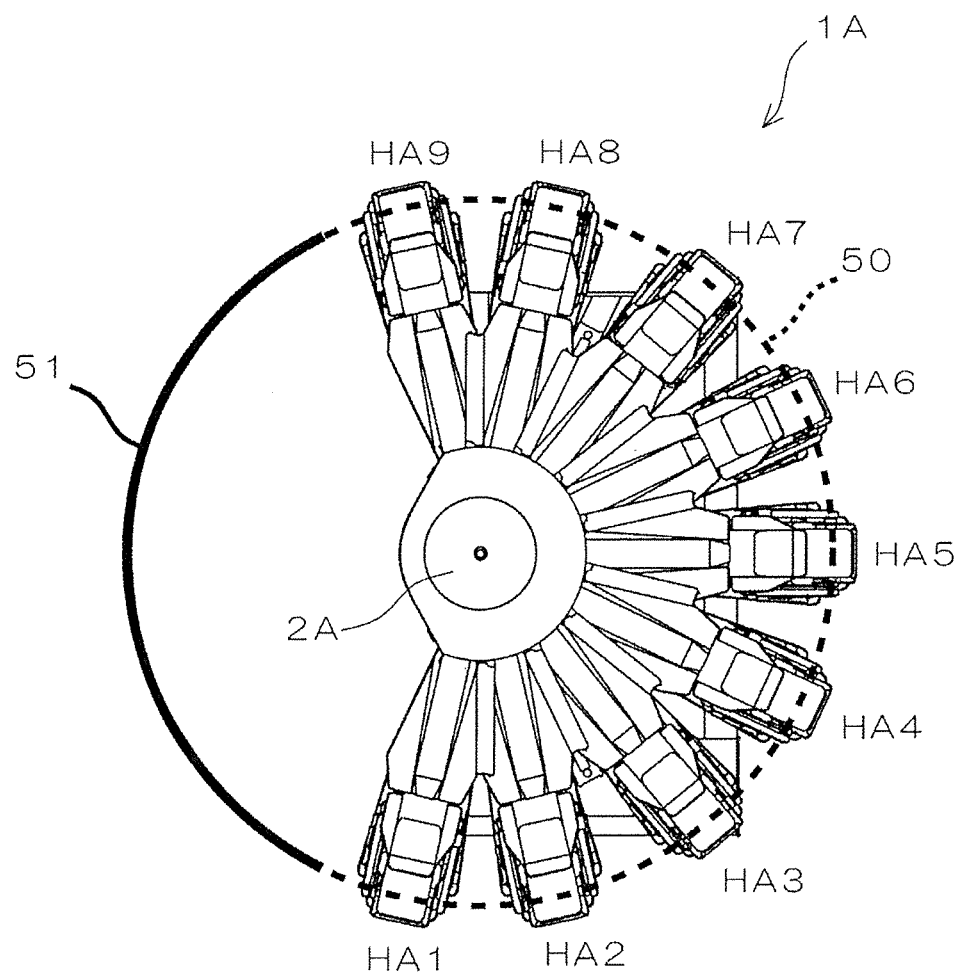
FIG. 5 is a top view showing, in isolation, one of the combination measuring units shown in FIG. 2.

FIG. 5 is a top view showing, in isolation, the combination measuring unit 1A shown in FIG. 2. The heads HA1 through HA9 are provided in a row on a circle 50 surrounding the dispersing table 2A. The circle 50 may not necessarily be a true circle, but may also be an ellipse approximating a true circle. In the present embodiment, a maximum of fourteen heads may be arranged in a row on the circle 50; however, in the present example, five of the fourteen heads in a region correspond to a circular arc region 51 forming part of the circle 50 have been removed (in other words, the five heads are not provided). The heads HA1 through HA9 are provided in close proximity to each other on a region on the circle 50 other than the circular arc region 51 (in other words, the heads HA1 through HA9 are arranged on a line formed by cutting away the circular arc region 51 from the circle 50, which has the circular arc region 51 as a part thereof, so as to trace the line). The number of heads to be removed is not limited to five as described above; one or more heads may be removed as desired.

With reference to FIG. 2, in the combination measuring unit 1B, as with the combination measuring unit 1A, the heads HB1 through HB9 are provided in a row on a circle surrounding the dispersing table 2B, and five of the maximum fourteen heads have been removed. The combination measuring unit 1A and the combination measuring unit 1B are connected to each other in an orientation in which each of the respective regions from which the heads are removed are facing each other and the regions are shared between the combination measuring units 1A and 1B. In other words, the combination measuring unit 1A and the combination measuring unit 1B are connected to each other in an orientation in which a portion corresponding to the circular arc region 51 of the combination measuring unit 1A and a portion corresponding to the circular arc region of the combination measuring unit 1B face each other.

FIG. 6 is a schematic side view showing a configuration of the head HA5. The head HA5 (head section) comprises a trough 3A5, a pool hopper 4A5, a measurement hopper 5A5, and a storage hopper 6A5. The measurement hopper 5A5 is connected to a load cell or another measuring section 8A5. A lower end portion of the storage hopper 6A5 extends up to an upper region of an open upper surface 7AU of an assembling chute 7A. An article-ejecting outlet 7AL is formed on a bottom portion of the assembling chute 7A.

Although not shown, each of the other heads HA1 through HA4 and HA6 through HA9 has a similar configuration to that of the head HA5. Hereafter, troughs 3A1 through 3A9, pool hoppers 4A1 through 4A9, measurement hoppers 5A1 through 5A9, storage hoppers 6A1 through 6A9, and measuring sections 8A1 through 8A9, each provided to the heads HA1 through HA9, are respectively also referred to as troughs 3A, pool hoppers 4A, measurement hoppers 5A, storage hoppers 6A, and measuring sections 8A.

FIG. 7 is a drawing illustrating a positional relationship between article-ejecting outlets 7AL, 7BL and the heads HA1 through HA9 and HB1 through HB9. FIG. 7A is a top view showing a part of a structure on an upper surface of the combination measuring device 1 in isolation, FIG. 7B is a front view corresponding to FIG. 7A, and FIG. 7C is a cross-sectional view relating to a position along line Y-Y in FIG. 7B.

With reference to FIG. 7C, in the combination measuring unit 1A, the article-ejecting outlet 7AL is positioned at a center (including the vicinity of the center), as viewed from above, of a circle on which the storage hoppers 6A1 through 6A9 are arranged. Accordingly, the distances between the article-ejecting outlet 7AL and each respective lower end of each of the storage hoppers 6A1 through 6A9 are equal.

Figure 8:
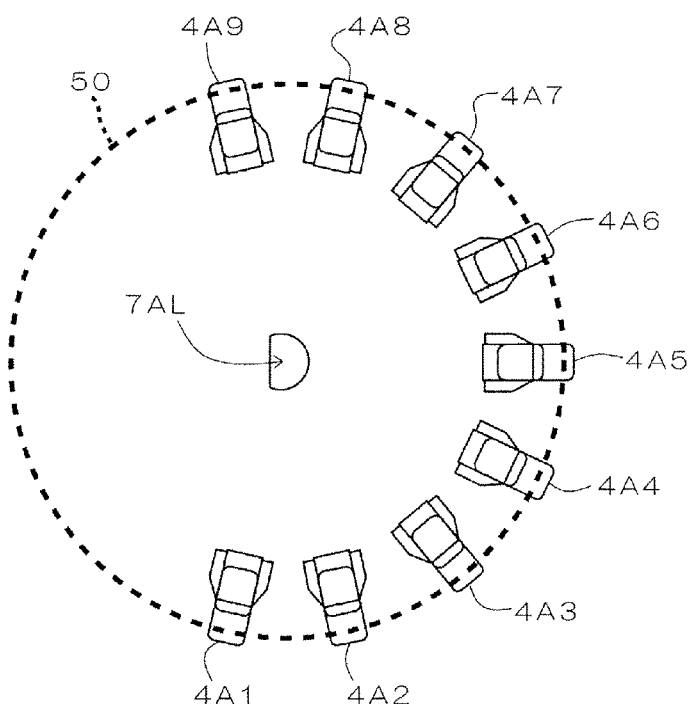
FIG. 8 is a drawing illustrating a positional relationship between an article-ejecting outlet and a pool hopper.

FIG. 8 is a drawing illustrating a positional relationship between the article-ejecting outlet 7AL and the pool hoppers 4A1 through 4A9. In the combination measuring unit 1A, the article-ejecting outlet 7AL is positioned at a center (including the vicinity of the center), as viewed from above, of the circle 50 on which the pool hoppers 4A1 through 4A9 (or measurement hoppers 5A1 to 5A9) are arranged. Similarly, in combination measuring unit 1B, the article-ejecting outlet 7BL is positioned at a center (including a region in the vicinity of the center), as viewed from above, of a circle on which the pool hoppers (or the measurement hoppers) of each of the heads HB1 through HB9 are arranged, although not shown.

With reference to FIGS. 7B and 7C, in the combination measuring unit 1B, assembling chutes 6B1 through 6B3 are provided instead of the storage hoppers 6A1 through 6A9 in the combination measuring unit 1A. The assembling chute 6B1 assembles articles ejected from each of the measurement hoppers of the heads HB1, HB2, and supplies the articles to an assembling chute 7B. The assembling chute 6B2 assembles articles ejected from each of the measurement hoppers of the heads HB3 through HB7, and supplies the articles to an assembling chute 7B. The assembling chute 6B3 assembles articles ejected from each of the measurement hoppers of the heads HB8 and HB9, and supplies the articles to an assembling chute 7B. With reference to FIG. 7C, in the combination measuring unit 1B, the article-ejecting outlet 7BL is positioned at a center (including the vicinity of the center) of a circle on which the assembling chutes 6B1 through 6B3 are arranged. Accordingly, the distances between the article-ejecting outlet 7BL and each respective lower end of each of the assembling chutes 6B1 through 6B3 are equal. An individual chute provided to each of the heads HB1 through HB9 may be used instead of the assembling chutes 6B1 through 6B3. Storage hoppers may be used instead of the assembling chutes 6B1 through 6B3 or the individual chutes, as with the combination measuring unit 1A.

An operation of the combination measuring unit 1A will now be described with reference to FIGS. 5 and 6. Food or other articles to be measured are loaded by being dropped onto a center portion of an upper surface of the dispersing table 2A from above the dispersing table 2A. The articles loaded onto the dispersing table 2A are radially dispersed by the dispersing table 2A, ejected from an outer peripheral edge of the dispersing table 2A, and supplied to an inner end portion of each of the troughs 3A of the heads HA1 through HA9. The troughs 3A carry the articles supplied from the dispersing table 2A from an inner side towards an outer side by vibration. The articles ejected from an outer end portion of the troughs 3A are supplied to the pool hoppers 4A and temporarily stored in the pool hoppers 4A. The articles ejected from the pool hoppers 4A are supplied to the measurement hoppers 5A. The articles are temporarily stored in the measurement hoppers 5A while being weighed by the measuring sections 8A. The articles ejected from the measurement hoppers 5A are supplied to the storage hoppers 6A, linked to the corresponding measurement value, and temporarily stored in the storage hoppers 6A. A combination of hoppers that would result in a weight that is equal to or nearest to a target weight is computationally obtained from all storage hoppers 6A (and measurement hoppers 5A) storing the articles, and the articles are ejected from the one or more hoppers that have been selected. The articles ejected from the storage hoppers 6A are supplied to the assembling chute 7A, assembled by the assembling chute 7A, and ejected from the article-ejecting outlet 7AL on the bottom portion of the assembling chute 7A towards a device further downstream (such as a packaging device). A timing hopper for synchronizing with an operation of the device further downstream may be provided between the assembling chute 7A and the device further downstream.

Figure 9:
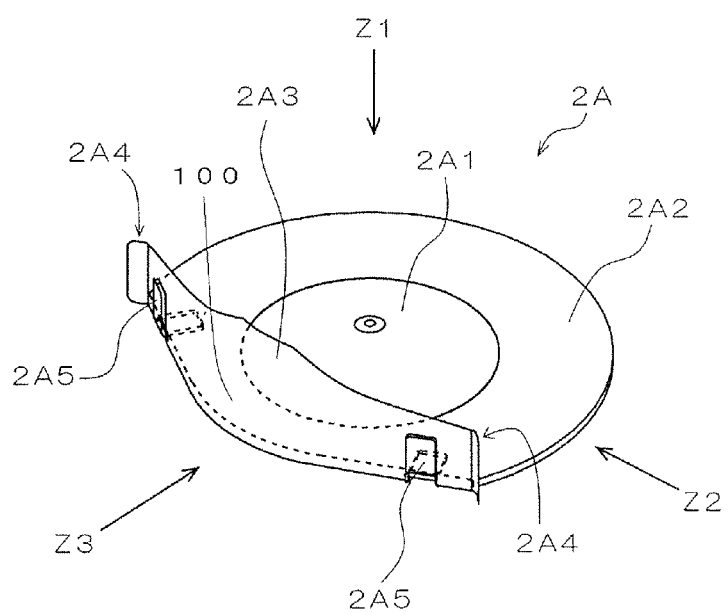
FIG. 9 is a perspective view showing a configuration of a dispersing table.
Figure 10:
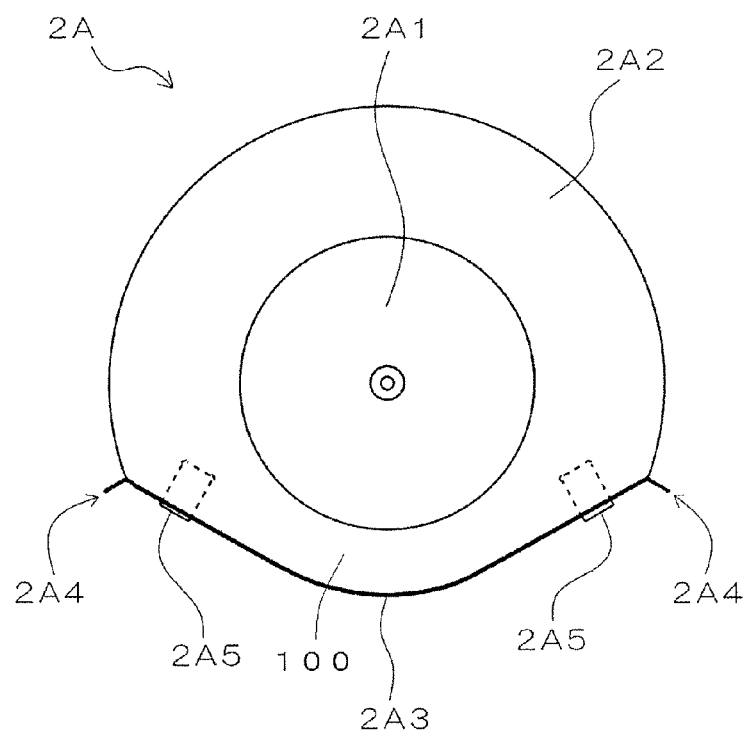
FIG. 10 is a top view showing the dispersing table viewed from the direction of arrow Z1 shown in FIG. 9.
Figure 11:
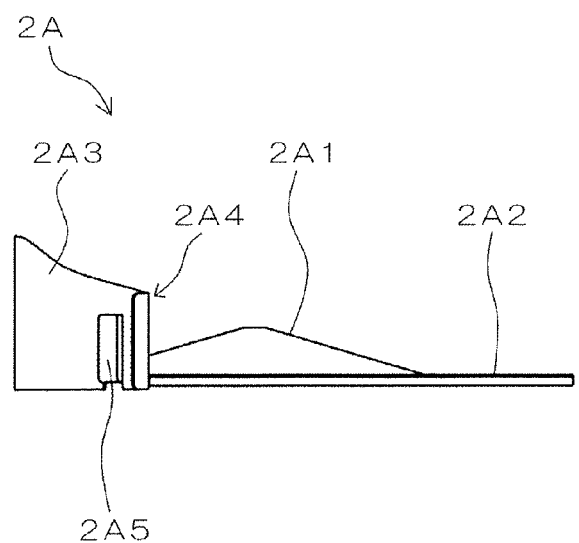
FIG. 11 is a side view showing the dispersing table viewed from the direction of arrow Z2 shown in FIG. 9.
Figure 12:
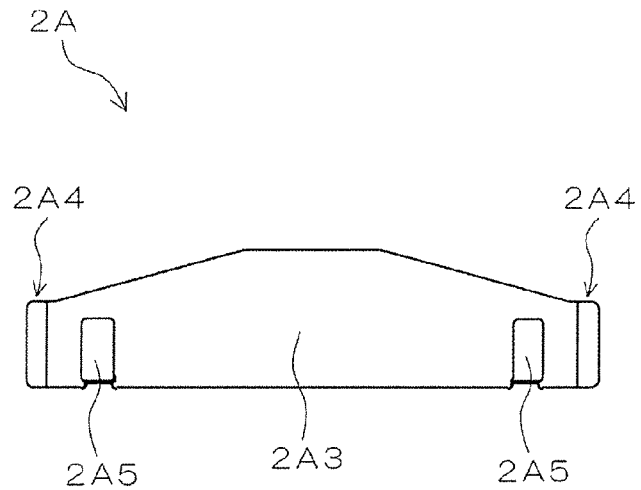
FIG. 12 is a rear view showing the dispersing table viewed from the direction of arrow Z3 shown in FIG. 9.

FIG. 9 is a perspective view showing a configuration of the dispersing table 2A. FIG. 10 is a top view showing the dispersing table 2A viewed from the direction of arrow Z1 shown in FIG. 9; FIG. 11 is a side view showing the dispersing table 2A viewed from the direction of arrow Z2 shown in FIG. 9; and FIG. 12 is a rear view showing the dispersing table 2A viewed from the direction of arrow Z3 shown in FIG. 9.

As shown in FIGS. 9 through 12, the dispersing table 2A has a conical inclined surface 2A1 having a high center portion and a low peripheral portion, and a horizontal surface 2A2 formed so as to surround the inclined surface 2A1. An inner circumference of the horizontal surface 2A2 is connected to an outer circumference of the inclined surface 2A1. A wall member 2A3 is mounted on a region forming part of an outer circumference of the horizontal surface 2A2. A back surface of the wall member 2A3 and a reverse surface of the horizontal surface 2A2 are secured to each other by a brace 2A5. An end portion 2A4 of the wall member 2A3 is angled outwards so as to prevent the end portion 2A4 from catching on the articles or damaging the articles due to a collision or a similar event. Mounting the wall member 2A3 on a region forming part of the outer circumference of the horizontal surface 2A2 results in the region being designated as a non-ejecting region 100 in which the articles are not ejected from the dispersing table 2A. As shown in FIG. 1, the non-ejecting region 100 of the dispersing table 2A matches a region from which the heads are removed. Although not shown, the dispersing table 2B has a structure that is similar to that of the dispersing table 2A. Although FIGS. 9 through 12 show an example of a type of dispersing table in which an upper surface comprises the inclined surface and the horizontal surface, the dispersing table may instead be of a type in which an upper surface comprises an inclined surface only, without the presence of a horizontal surface. The dispersing table may also be of a type in which an upper surface comprises a horizontal surface only, without the presence of an inclined surface.

Figure 13:
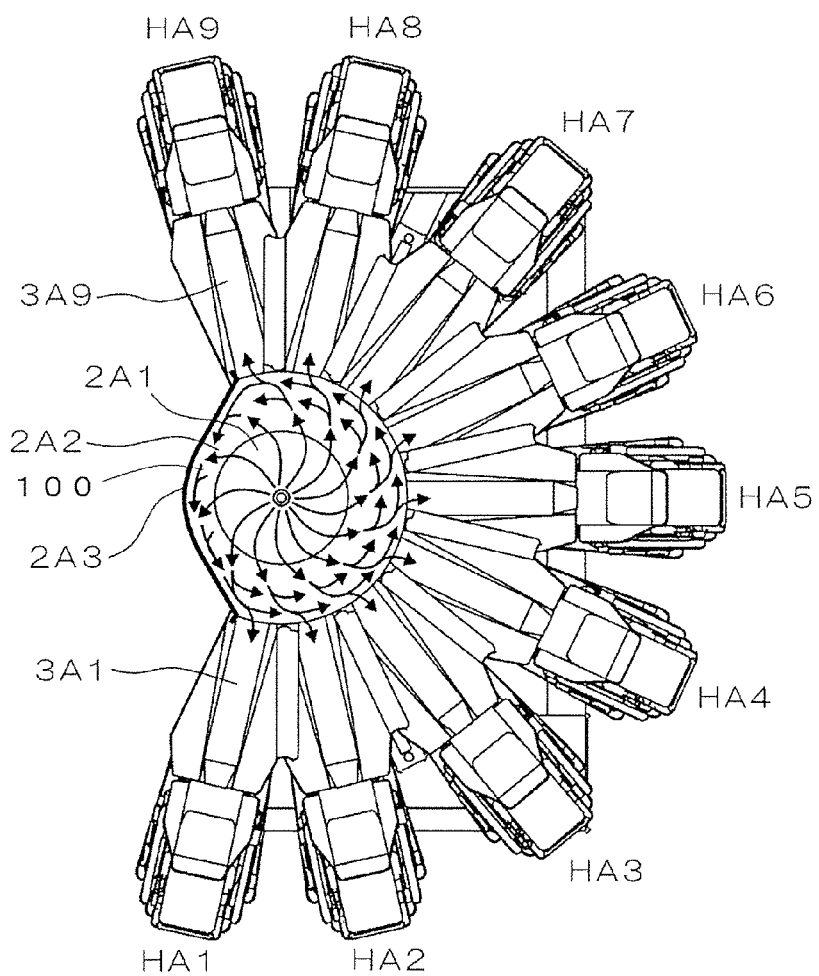
FIG. 13 is a drawing showing a flow of articles on the dispersing table.

FIG. 13 is a drawing showing a flow of articles on the dispersing table 2A. The dispersing table 2A is caused to vibrate in the circumferential direction, thereby causing the articles to radially disperse while moving in a counterclockwise direction (i.e., moving in a rotary manner) on the dispersing table 2A as shown by arrows on FIG. 13, and the articles to be supplied to each of the heads HA1 through HA9. In the non-ejecting region 100 on which the wall member 2A3 is formed, the articles are not ejected from atop the dispersing table 2A.

A portion of the horizontal surface 2A2 along the wall member 2A3 (and inclined surface 2A1) functions as a path for supplying (i.e., circulating) the articles from the vicinity of the head HA9 to the vicinity of the head HA1. Specifically, articles are carried from the inclined surface 2A1 and the vicinity of the head HA8 further upstream to the vicinity of the head HA9, which is the most downstream-positioned, in the direction of the rotary motion, of the heads HA1 through HA9. Of the articles carried to the vicinity of the head HA9, excess articles that were carried to the vicinity of the HA9 but not supplied to the trough 3A9 of the head HA9 move in a rotary manner on the dispersing table 2A along the wall member 2A3. Articles that moved from the inclined surface 2A1 towards the wall member 2A3 also move in a rotary manner on the dispersing table 2A along the wall member 2A3. All or part of the articles that have moved through the non-ejecting region 100 along the wall member 2A3 are supplied to the trough 3A1 of the head HA1, which is positioned the furthest upstream in the direction of the rotary motion.

A flow of articles carried in the vicinity of the non-ejecting region 100 of the dispersing table 2A will now be described in detail with reference to FIG. 14.

Figure 14:
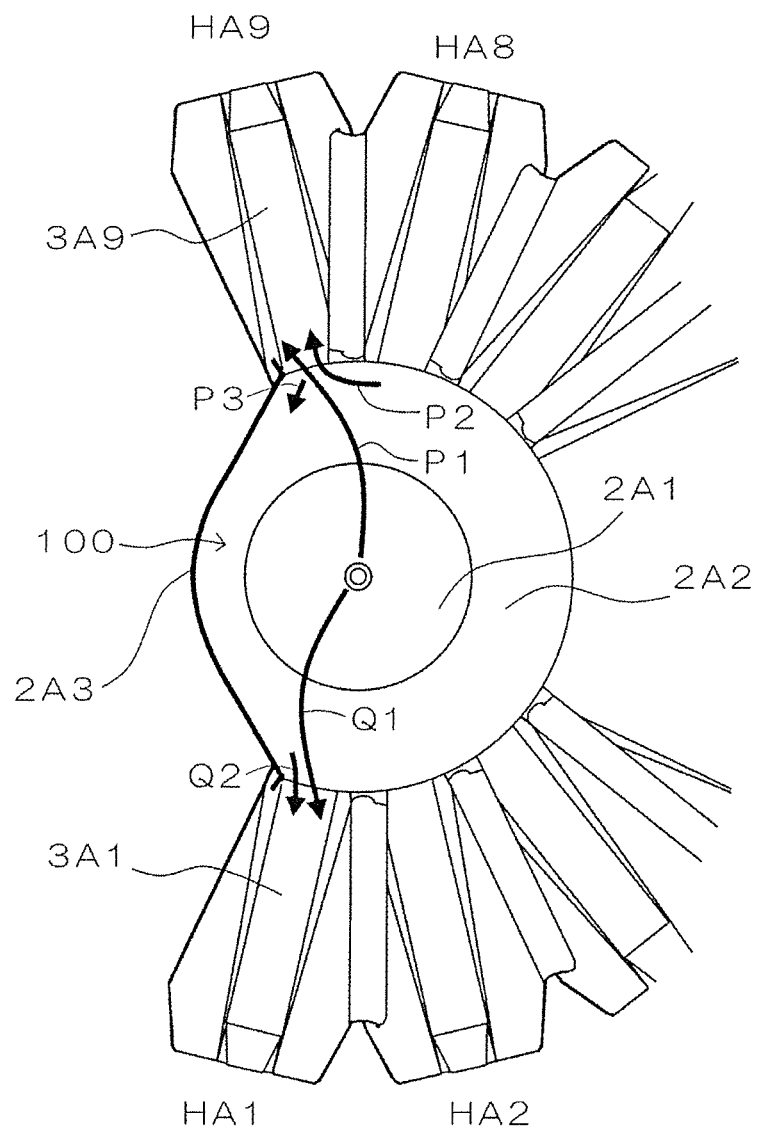
FIG. 14 is a drawing showing a part of FIG. 13 as an enlargement.

FIG. 14 is a drawing showing a part of FIG. 13 as an enlargement. A part of the outer peripheral region of the dispersing table 2A (i.e., a region along the wall member 2A3) is designated as the non-ejecting region 100.

An article supply path P1 and an article supply path P2 are provided as paths for articles moving towards the vicinity of the head HA9, which is adjacent to the non-ejecting region 100 on the upstream side of the non-ejecting region 100 in the direction of the rotary motion. The article supply path P1 is a path from a region where the articles are loaded at a center portion of the dispersing table 2A towards the vicinity of the trough 3A9 of the head HA9 along a radial direction of the dispersing table 2A (strictly speaking, the path curves due to rotation). The article supply path P2 is a path from the upstream area of the head HA9 in the direction of the rotary motion towards the vicinity of the trough 3A9 of the head HA9 along a circumferential direction of the dispersing table 2A. There is also provided, on the dispersing table 2A, an article ejecting path P3 for ejecting excess articles that were carried on the dispersing table 2A to the vicinity of the HA9 (i.e., along the article supply paths P1, P2), but not supplied to the trough 3A9 of the head HA9, towards the non-ejecting region 100. In other words, the article ejecting path P3 is a path for carrying articles from the vicinity of the head HA9, which is positioned the furthest downstream in the direction of the rotary motion.

An article supply path Q1 and an article supply path Q2 are provided as paths for articles moving towards the vicinity of the head HA1, which is adjacent to the non-ejecting region 100 on the downstream side of the non-ejecting region 100 in the direction of the rotary motion. The article supply path Q1 is a path from a region where the articles are loaded at a center portion of the dispersing table 2A towards the vicinity of the trough 3A1 of the head HA1 along a radial direction of the dispersing table 2A (strictly speaking, the path curves due to rotation). The article supply path Q2 is a path from the non-ejecting region 100 on the upstream area of the head HA1 in the direction of the rotary motion towards the vicinity of the trough 3A1 of the head HA1 along a circumferential direction of the dispersing table 2A. In other words, the article supply path Q2 is a path for carrying the articles towards the vicinity of the head HA1, which is positioned the furthest upstream in the direction of the rotary motion. The article ejecting path P3 for ejecting articles from the vicinity of the head HA9 and the article supply path Q2 for supplying articles towards the vicinity of the head HA1 impart the non-ejecting region 100 with a function of a path for circulating the articles from the vicinity of the head HA9 to the vicinity of the head HA1.

Although not shown in FIG. 14, excess articles that have been carried on the dispersing table 2A to the vicinity of the HA1 (i.e., along the article supply paths Q1, Q2), but not supplied to the trough 3A1 of the head HA1, flow on the dispersing table 2A downstream in the direction of the rotary motion.

While FIGS. 13 and 14 are used to describe the dispersing table 2A, the dispersing table 2B operates in a similar manner.

(1) According to the combination measuring units 1A, 1B according to the present embodiment, the heads HA1 through HA9 and HB1 through HB9 are arranged on a line formed by cutting away the circular arc region 51 from the circle 50, which has the circular arc region as a part thereof, surrounding the dispersing tables 2A, 2B, as shown in FIGS. 2 and 5. Therefore, in comparison to a unit in which the same number of heads are arranged in a row along the whole of the circle surrounding the dispersing tables 2A, 2B, the heads HA1 through HA9 and HB1 through HB9 can be provided in close proximity to each other. Therefore, there is no need to increase the trough width in order to fill the gap between adjacent troughs, making it possible to use troughs having an optimum trough width. As a result, it is possible to prevent the efficiency of conveyance of the articles by the trough from decreasing. Also, there is no need to reduce the diameter of the dispersing tables 2A, 2B in order to fill the gap between adjacent troughs, making it possible to prevent the function of the dispersing tables 2A, 2B of accumulating the articles from decreasing. As a result, according to the combination measuring unit 1A, 1B according to the present embodiment, it is possible to achieve stable supply of the articles into the pool hoppers or measurement hoppers.

(2) According to the combination measuring device 1 according to the present embodiment, a plurality of the combination measuring units 1A, 1B are connected so that respective portions corresponding to the circular arcs, which does not face the heads HA1 through HA9 and HB1 through HB9, face each other, as shown in FIG. 2. Therefore, it becomes possible to reduce the overall area on which the device is installed in comparison with an instance in which a plurality of combination measuring units 1A, 1B are arranged individually in a row without being connected. In other words, it becomes possible to effectively utilize dead spaces on which the heads are not provided, while reducing the area on which the device is installed.

(3) According to the combination measuring device 1 according to the present embodiment, in each of the combined measuring units 1A, 1B, each of the article-ejecting outlets 7AL, 7BL is positioned at a center of the circle 50 along which the pool hoppers and the measurement hoppers are arranged, as shown in FIGS. 7 and 8. Therefore, in each of the combined measuring units 1A, 1B, the distances between each of the hoppers and the article ejecting outlet 7AL, 7BL are equal. Therefore, it becomes possible to equalize, in the hoppers, the time required for an article ejected by the hopper to reach the article ejecting outlet 7AL, 7BL, and the falling velocity of the article upon reaching the article ejecting outlet 7AL, 7BL. Consequently, the processing speed of each of the combination measuring units 1A, 1B can be prevented from being diminished as a result of any variation in the required time or the fall velocity.

(4) According to the combination measuring unit 1A, 1B according to the present embodiment, in the combination measuring unit 1A, as shown in FIG. 13, a route for carrying the articles from the vicinity of the head HA9 adjacent to one end of the non-ejecting region 100 to the vicinity of the head HA1 adjacent to the other end of the non-ejecting region 100 is provided to the non-ejecting region 100 of the dispersing table 2A. Therefore, it becomes possible to effectively utilize the non-ejecting region 100, which represents a dead space, while effectively preventing excessive supply of articles to the head HA9 adjacent to one end as well as a shortfall in supply of articles to the head HA1 adjacent to the other end. The above is also true for the combination measuring unit 1B.

(5) In the combination measuring device according to prior art, articles to be measured are loaded, by being dropped, onto a dispersing table from above a main device body. A plurality of feed troughs are arranged in a row in a circle surrounding the dispersing table. The articles loaded onto the dispersing table are radially dispersed by the dispersing table and fed into the feed troughs. The dispersing table is made to vibrate in a circumferential direction of the dispersing table, thereby scattering the articles as they move over the dispersing table in a diagonally downward direction with a center of rotation located at a center of the dispersing table, and feeding the articles into the feed troughs.

A pool hopper is provided under a distal end portion of each of the feed troughs. The articles carried by the feed trough are fed into and stored in the pool hopper. A measurement hopper is provided under the pool hopper. The articles ejected from the pool hopper are fed into the measurement hopper and weighed. An assembling chute is provided under the measurement hopper. A combination of one or more measurement hoppers that result in a measurement value that is equal to or nearest to a target value is selected from all measurement hoppers. The articles ejected from the selected measurement hoppers are assembled by the assembling chute and ejected to the exterior of the device.

As disclosed in Japanese Examined Utility Model Application Publication 4-41304, one combination measuring device may be used to perform measurements on two types of articles. In such an instance, an upper surface of one dispersing table is divided by a partition into two sections, and different types of articles are loaded into each of the sections.

In a feed trough that is adjacent to the partition in a direction downstream in the direction of movement of the articles, there is likely to be an excess in the amount of articles supplied from the dispersing table. Meanwhile, in a feed trough that is adjacent to the partition in a direction upstream of the direction of movement of the articles, there is likely to be a shortfall in the amount of articles supplied from the dispersing table. Therefore, it is difficult to supply an appropriate amount of articles into measurement hoppers that correspond to such feed troughs.

However, according to the combination measuring device 1 of the present embodiment, the amount of articles supplied from the dispersing table to the feed trough can be prevented from deviating significantly from an appropriate level in a specific head.

More specifically, according to the combination measuring unit 1A according to the present embodiment, a region forming part of the dispersing table 2A is designated as a non-ejecting region 100 in which the articles are not ejected from the dispersing table 2A. In addition to the article supply path Q1 for carrying the articles towards the vicinity of the head HA1, the article supply path Q2 is also provided. The head HA1 is a head that is adjacent to the non-ejecting region 100 in a direction upstream in the direction of movement of the articles, where there is likely to be a shortfall in the amount of articles supplied from the dispersing section. Therefore, more articles can be supplied to the head HA1 than in a device in which only the article supply path Q1 is provided. As a result, it becomes possible to prevent the amount of articles supplied from the dispersing table 2A to the trough 3A1 from deviating significantly from an appropriate level. The above is also true for the combination measuring unit 1B.

According to the combination measuring unit 1A according to the present embodiment, a region forming part of the dispersing table 2A is designated as a non-ejecting region 100 in which articles are not ejected from the dispersing table 2A. There is provided an article ejecting path P3 for ejecting, towards the non-ejecting region 100, excess articles that have been carried on the dispersing table 2A to the vicinity of the HA9, but not supplied to the head HA9. The head HA9 is a head that is adjacent to the non-ejecting region 100 in a direction downstream in the direction of movement of the articles, where there is likely to be an excess in the amount of articles supplied from the dispersing table 2A. Therefore, it becomes possible to reduce the degree by which the amount of articles supplied from the dispersing table 2A to the head HA9 becomes excessive, compared to a device that does not have the article ejecting path P3. As a result, it becomes possible to prevent the amount of articles supplied from the dispersing table 2A to the trough 3A9 from deviating significantly from an appropriate level. The above is also true for the combination measuring unit 1B.

The invention claimed is;

1. A combination measuring device comprising:
    at least one combination measuring unit including
        a dispersing section configured and arranged to radially disperse articles loaded thereinto from above,
        a plurality of head sections configured and arranged to receive the articles from the dispersing section, each of the head sections including a hopper to hold the articles therein, and
        an assembling section configured and arranged to assemble the articles contained in one or more of the hoppers selected according to a target weight, the head sections being arranged on a line formed by cutting away a circular arc from a circle surrounding the dispersing section,
    in the combination measuring unit,
    a part of an outer peripheral region of the dispersing section is designated as a non-ejecting region in which the articles are not ejected, the non-ejecting region having a first end and a second end, and
    the non-ejecting region of the dispersing section includes a route such that the articles move from a vicinity of one of the head sections that is adjacent to the first end of the non-ejecting region along the route to a vicinity of one of the head sections that is adjacent to the second end of the non-ejecting region.

2. The combination measuring device according to claim 1, wherein
    the at least one combination measuring unit includes a plurality of the combination measuring units, and
    the combination measuring units are connected so that regions corresponding to the circular arcs face each other.

3. The combination measuring device according to claim 2, wherein
    in each of the combination measuring units,
    the assembling section has an ejecting outlet via which the articles are ejected to the exterior of the combination measuring unit, and
    the ejecting outlet is positioned at substantially a center of the circle.

4. The combination measuring device according to claim 1, wherein
    a part of an outer peripheral region of the dispersing section is designated as a non-ejecting region in which the articles are not ejected, and
    the dispersing section includes a first path, along a radial direction of the dispersing section, for channeling the articles from a center section of the dispersing section toward a vicinity of one of the head sections adjacent to the non-ejecting region, and a second path, along a circumferential direction of the dispersing section, for channeling the articles from the non-ejecting region toward the vicinity of the one of the head sections.

5. The combination measuring device according to claim 1, wherein
    a part of an outer peripheral region of the dispersing section is designated as a non-ejecting region in which the articles are not ejected, and
    the dispersing section includes a path for channeling, towards the non-ejecting region, the articles that have been carried on the dispersing section towards a vicinity of one of the head sections adjacent to the non-ejecting region but that was not supplied to the one of the head sections.

6. The combination measuring device according to claim 1, wherein
    the non-ejecting region faces a region corresponding to the circular arc.

7. The combination measuring device according to claim 4, wherein the non-ejecting region faces a region corresponding to the circular arc.

8. The combination measuring device according to claim 5, wherein the non-ejecting region faces a region corresponding to the circular arc.

9. The combination measuring device according to claim 1, wherein
    the dispersing section is configured to move the articles along the route in response to vibration of the dispersing section.

10. The combination measuring device according to claim 1, wherein
    the dispersing section includes a high center portion and a horizontal surface, with the route being defined along a portion of the horizontal surface.

* * * * *